(12) United States Patent
Bedillion et al.

(10) Patent No.: US 7,903,533 B2
(45) Date of Patent: Mar. 8, 2011

(54) PROBE HEAD WITH NARROW READ ELEMENT

(75) Inventors: Mark David Bedillion, Allison Park, PA (US); Andreas Karl Roelofs, Pittsburgh, PA (US); Earl Chrzaszcz Johns, Sewickley, PA (US); Yongjun Zhao, Pittsburgh, PA (US); Edward Stephen Skalko, Allison Park, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 973 days.

(21) Appl. No.: 11/738,615

(22) Filed: Apr. 23, 2007

(65) Prior Publication Data

US 2008/0259779 A1 Oct. 23, 2008

(51) Int. Cl.
*G11B 9/00* (2006.01)

(52) U.S. Cl. .......................................................... 369/126

(58) Field of Classification Search .................... 369/126
See application file for complete search history.

(56) References Cited

U.S. PATENT DOCUMENTS

| | | | |
|---|---|---|---|
| 5,412,597 A * | 5/1995 | Miyazaki et al. | 369/126 |
| 5,978,326 A | 11/1999 | Shido | |
| 5,994,698 A * | 11/1999 | Kawade et al. | 850/26 |
| 6,757,143 B2 * | 6/2004 | Tunayama et al. | 360/324.1 |
| 7,065,033 B2 | 6/2006 | Onoe et al. | |
| 7,663,840 B2 * | 2/2010 | Mallary | 360/131 |
| 2002/0080710 A1 * | 6/2002 | Kim et al. | 369/126 |
| 2004/0027935 A1 | 2/2004 | Cho et al. | |
| 2004/0042351 A1 | 3/2004 | Onoe et al. | |
| 2005/0052984 A1 | 3/2005 | Hong et al. | |
| 2005/0094430 A1 | 5/2005 | Nauka et al. | |
| 2006/0018239 A1 | 1/2006 | Nam et al. | |
| 2006/0023606 A1 * | 2/2006 | Lutwyche et al. | 369/100 |
| 2006/0182004 A1 | 8/2006 | Maeda et al. | |
| 2007/0274193 A1 * | 11/2007 | Akiyama et al. | 369/126 |

* cited by examiner

*Primary Examiner* — Thang V Tran
(74) *Attorney, Agent, or Firm* — Robert P. Lenart, Esq.; Pietragallo Gordon Alfano Bosick & Raspanti, LLP

(57) ABSTRACT

An apparatus includes a storage medium, and a transducer positioned adjacent to the storage medium, wherein the transducer includes a first electrode and a second electrode, with the width of the first electrode being less than the width of the second electrode. A method including: applying a first voltage to a transducer to write data to a storage medium, and applying a second voltage to the transducer to read data from the storage medium, wherein the magnitude of the first voltage is greater than the magnitude of the second voltage.

19 Claims, 6 Drawing Sheets

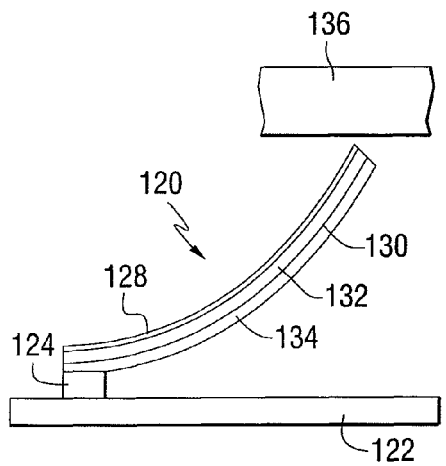
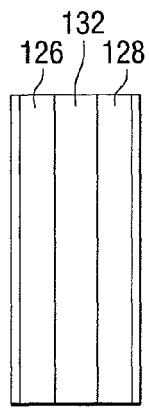
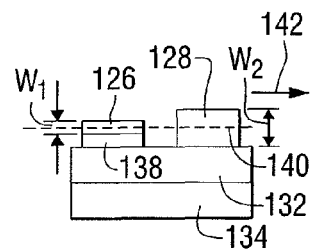
FIG. 11    FIG. 12    FIG. 13
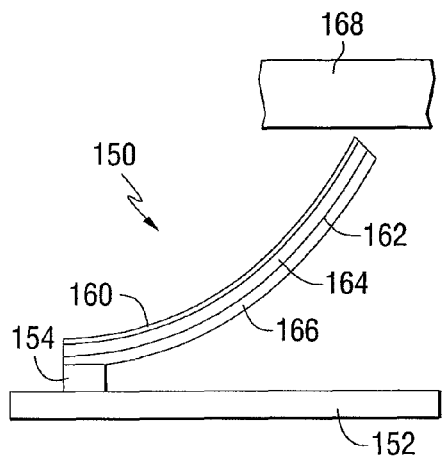
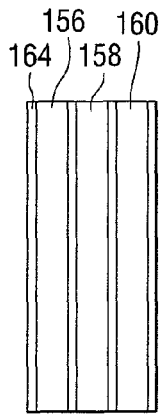
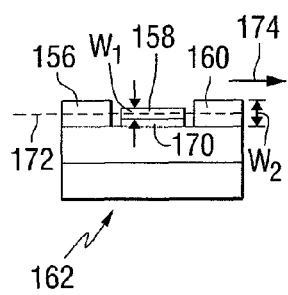
FIG. 14    FIG. 15    FIG. 16

PROBE HEAD WITH NARROW READ ELEMENT

FIELD OF THE INVENTION

This invention relates to data storage devices, and more particularly to probe storage devices.

BACKGROUND OF THE INVENTION

Probe storage devices have been developed to provide small size, high capacity, low cost data storage devices. Probe recording requires relative movement between a storage medium and an array of probe transducers that are used to subject the storage medium to electric, magnetic, or other fields. The storage medium can be a planar thin film structure.

Probe-based data storage devices use a large number of probe transducers that move over a storage medium surface, with each probe needing to move only a relatively small distance with respect to the medium, in a manner similar to a Scanning Probe Microscope (SPM). To maximize the achievable recording density, the probes are generally operated in physical contact or near-contact with the surface of the storage medium.

Scanning probe storage devices based on a ferroelectric storage medium include one or more transducers, each including an electrode or tip that moves relative to a ferroelectric thin film storage medium. To write a bit to the storage medium, a voltage pulse of either positive or negative polarity is applied between the electrode and the medium, and a binary "1" or "0" is stored by causing the polarization of a spatially small region (i.e., a domain) of the ferroelectric storage medium near the tip to point "up" or "down". Data can then be read out by a variety of means, including sensing of piezoelectric surface displacement, measurement of local conductivity changes, or by sensing current flow during polarization reversal (i.e., destructive readout).

Destructive readout can be performed by applying a read voltage of a magnitude and polarity such as to cause the polarization to point "up". Domains polarized "down" (e.g., representing "0") will then switch to the "up" state, and a charge will flow which is proportional to the remanent polarization of the ferroelectric storage medium. Domains polarized "up" will have no such current flow. The presence or absence of this current flow, as determined by a sense amplifier, can then be used to determine whether the domain had contained a "1" or "0".

Probe storage devices can provide a high data storage capacity in a very small form factor. In one example, a device having a capacity of 20 GB requires a density of 880 Gb/in$^2$. The device of this example requires a track width of 50 nm, which places difficult requirements on the servo system accuracy. Current transducer designs use the same conductor for both reading and writing, which places a strong limit on Write-to-Read Track MisRegistration (WRTMR). Write-to-Read Track MisRegistration is the positioning requirement based on the need to read written signals with sufficient signal-to-noise ratio (SNR). Write-to-Write Track MisRegistration (WWTMR) is the positioning requirement based on the need to not overwrite adjacent tracks.

There is a need for a data storage device that can provide a large amount of data storage but have less restrictive track misregistration requirements.

SUMMARY OF THE INVENTION

In a first aspect, the invention provides an apparatus including a storage medium, and a transducer positioned adjacent to the storage medium, wherein the transducer includes a first electrode and a second electrode, with the width of the first electrode being less than the width of the second electrode.

The transducer can be supported by a suspension assembly or cantilever support structure. Ends of the first and second electrodes can be centered on a common axis. The apparatus can further comprise a third electrode, wherein the second and third electrodes are positioned on opposite sides of the first electrode and the width of the first electrode is less than the width of the third electrode.

The electrodes can be mounted on a silicon body with conductors connected to the first and second electrodes lying adjacent to crystallographic planes of the silicon body.

In another aspect, the invention provides a method including: applying a first voltage to a transducer to write data to a storage medium, and applying a second voltage to the transducer to read data from the storage medium, wherein the magnitude of the first voltage is greater than the magnitude of the second voltage. The storage medium can be a ferroelectric storage medium.

In another aspect, the invention provides a method including: positioning a transducer adjacent to a storage medium, wherein the transducer includes a first electrode and a second electrode, with the width of the first electrode being less than the width of the second electrode, and applying the same voltage to the first and second electrodes when reading data from the storage medium. The storage medium can be a ferroelectric storage medium.

BRIEF DESCRIPTION OF THE DRAWINGS

FIGS. 11, 12 and 13 are side, top and end views of a cantilever transducer constructed in accordance with an example of the invention.

FIGS. 14, 15 and 16 are side, top and end views of another cantilever transducer constructed in accordance with another example of the invention.

DETAILED DESCRIPTION OF THE INVENTION

Figure 1:
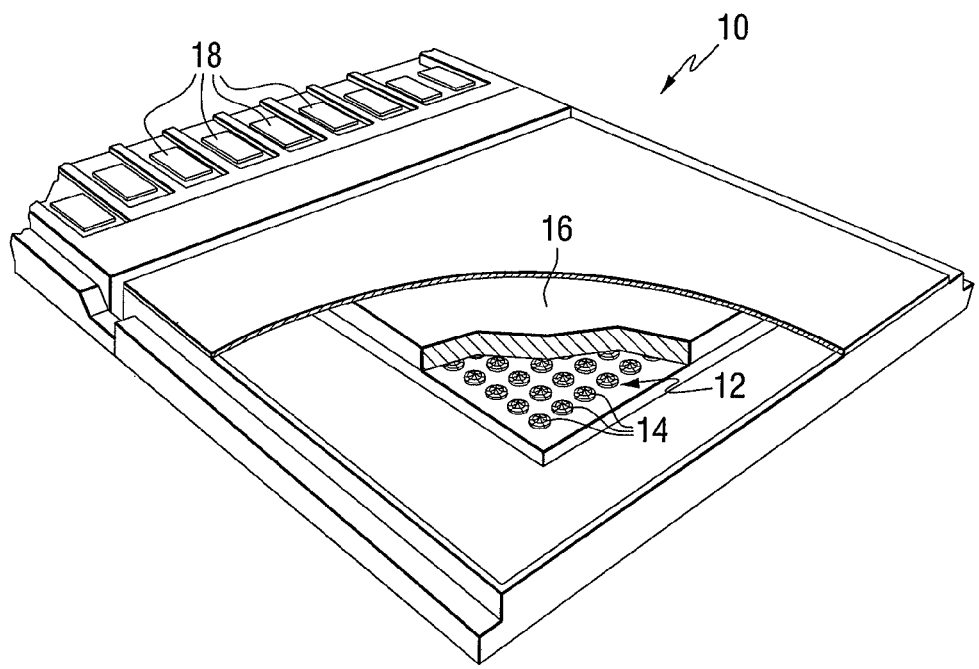
FIG. 1 is a perspective view of a data storage device that can be constructed in accordance with an aspect of the invention.

Referring to the drawings, FIG. 1 is a perspective view of a probe storage device 10 that can be constructed in accordance with an aspect of the invention. In the storage device 10 of FIG. 1, an array 12 of transducers 14, also called probes, tips or heads, are positioned adjacent to a storage media 16. The ends of the probes 14 and a recording surface of the storage media 16 lie in planes that are generally parallel with each other. The probes 14 are electrically coupled to connectors 18 through a controller, not shown. The storage media 16 can be coupled to at least one actuator (not shown in this view), which is configured to move the medium 16 relative to array 12. This movement causes individual storage locations or domains on medium 16 to be moved relative to the transducers. Each transducer can include one or more electrodes. The storage medium in the example of FIG. 1 can be, for example, a ferroelectric, magnetic or optical storage medium.

Figure 2:
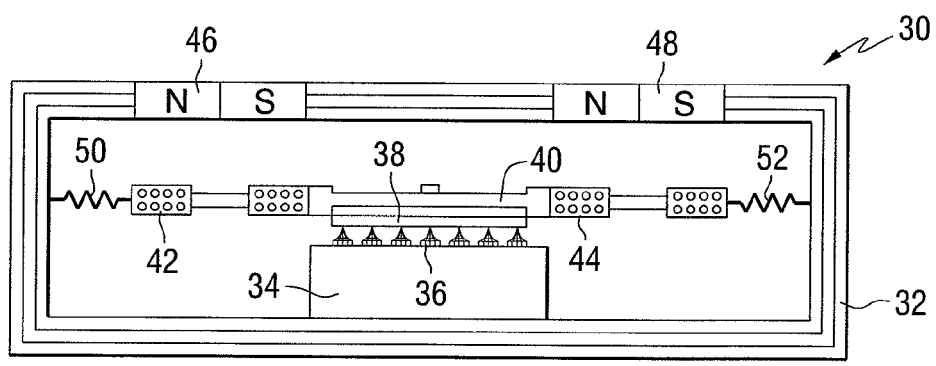
FIG. 2 is a cross-sectional view of a probe storage device.

Probe storage devices include actuators and suspension assemblies for providing relative movement between the storage medium and an array of probes. FIG. 2 is a cross-sectional view of a probe storage device 30. The device includes an enclosure 32, also referred to as a case, base, or frame, which contains a substrate 34. An array of probes 36 is positioned on the substrate. The probes extend upward to make contact with a storage media 38. The storage media 38 is mounted on a movable member, or sled 40. In this example, relative movement between the storage media and the probes is provided by an electromagnetic actuator that includes coils and magnets. Coils 42 and 44 are mounted on the movable member. Magnets 46 and 48 are mounted in the enclosure near the coils. Springs 50 and 52 form part of a suspension assembly that supports the movable member. The enclosure 32 can be formed of, for example, injection molded plastic. While FIG. 2 shows one example of a probe storage device, it will be recognized that other known types of suspensions and actuators can be used to position the components and to provide relative movement between the probes and the storage media. This invention is not limited to devices that use any particular probe and media positioning and/or actuating devices.

In ferroelectric probe storage devices, the transducers include an electrode that is used to subject the storage media to an electric field. The data can be written in tracks on the storage medium. Track squeeze occurs when data in adjacent tracks interferes with data in a track of interest.

To eliminate track squeeze, the position of the transducers with respect to the storage medium must be tightly controlled. More specifically, in one example the position error signal (PES) cannot be allowed to exceed ½ the free space between tracks, or $$|PES| \leq \frac{\left(\frac{1}{TPI} - W\right)}{2}, \quad (1)$$

where TPI is the tracks per inch, and W is the width of the writer. The position error signal is an output of a position error signal demodulator, and represents a spatial deviation from a center of a track of data.

In current probe storage devices, a single electrode is used for both reading and writing. In a transducer that uses a single electrode, from Write-to-Read Track MisRegistration (WRTMR) considerations, the transducer must have at least a certain percentage of its tip width exposed to correct data. That is, the absolute value of the PES must be $$|PES| \leq \frac{(1-\alpha)W}{2}, \quad (2)$$

where $\alpha$ is the percentage of the width of the read transducer that sees the correct data. In this case, the signal-to-noise ratio (SNR) is fundamentally related to the PES limit by $$SNR \geq \frac{\alpha}{1-\alpha}. \quad (3)$$

For a 50 nm track pitch and a 20 dB SNR, equations (1) and (2) combine to place a bound on the PES of $$|PES| \leq 2.1 \text{ nm}. \quad (4)$$

In probe storage devices, the electrode can be brought into contact or near-contact with a surface of a storage medium using a variety of devices, such as levers that raise the metal electrode into contact with the surface of the storage medium, or springs or other structures that press the electrode into contact with the surface of the storage medium.

Figures 3, 4, 5:
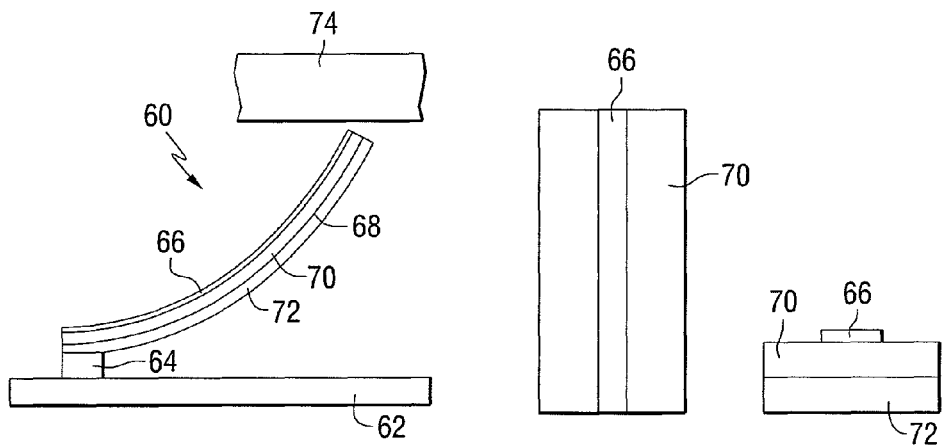
FIGS. 3, 4 and 5 are side, top and end views of a cantilever transducer that can be used in a probe storage device.

FIGS. 3, 4 and 5 are side, top and end views of a cantilever transducer 60 that can be used in a probe storage device. The transducer is mounted on a substrate 62 by a base 64. An electrode 66 is supported by a bi-layer structure 68 having layers 70 and 72 of different mechanical properties such that the transducer curves toward a storage medium 74.

Figure 6:
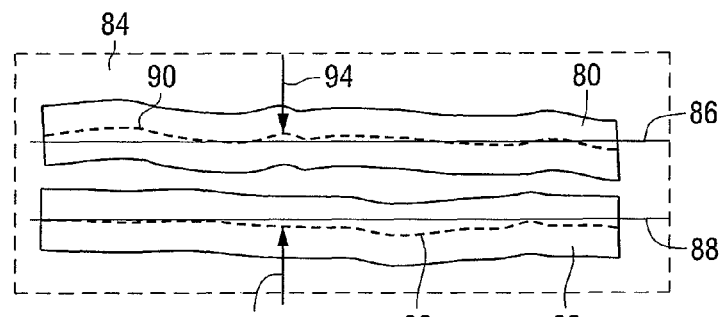
FIG. 6 is a schematic representation of two tracks of written data on a storage medium.

FIG. 6 is a schematic representation of two tracks 80 and 82 of written data on a storage medium 84. Line 86 shows the ideal center of track 80, and line 88 shows the ideal center of track 82. Line 90 shows the actual center of track 80, and line 92 shows the actual center of track 82. The maximum distance between the actual centers of the tracks is the Write-to-Write Track MisRegistration. In this example, arrows 94 and 96 show the Write-to-Write Track MisRegistration.

Figure 7:
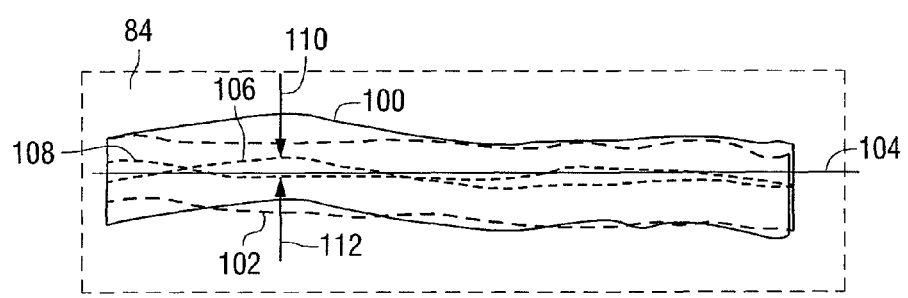
FIG. 7 is a schematic representation of a track of written data and a track of a read head.

FIG. 7 is a schematic representation of a track 100 of written data and a track 102 of a read transducer on the data storage medium 84. Line 104 shows the ideal center of both the written data track 100 and the read head track 102. Line 106 shows the actual center of track 100, and line 108 shows the actual center of track 102. The maximum distance between the centers of the written data track and the read head track is the Write-to-Read Track MisRegistration. In this example the Write-to-Read Track MisRegistration is illustrated by the distance between arrows 110 and 112.

Figure 8:
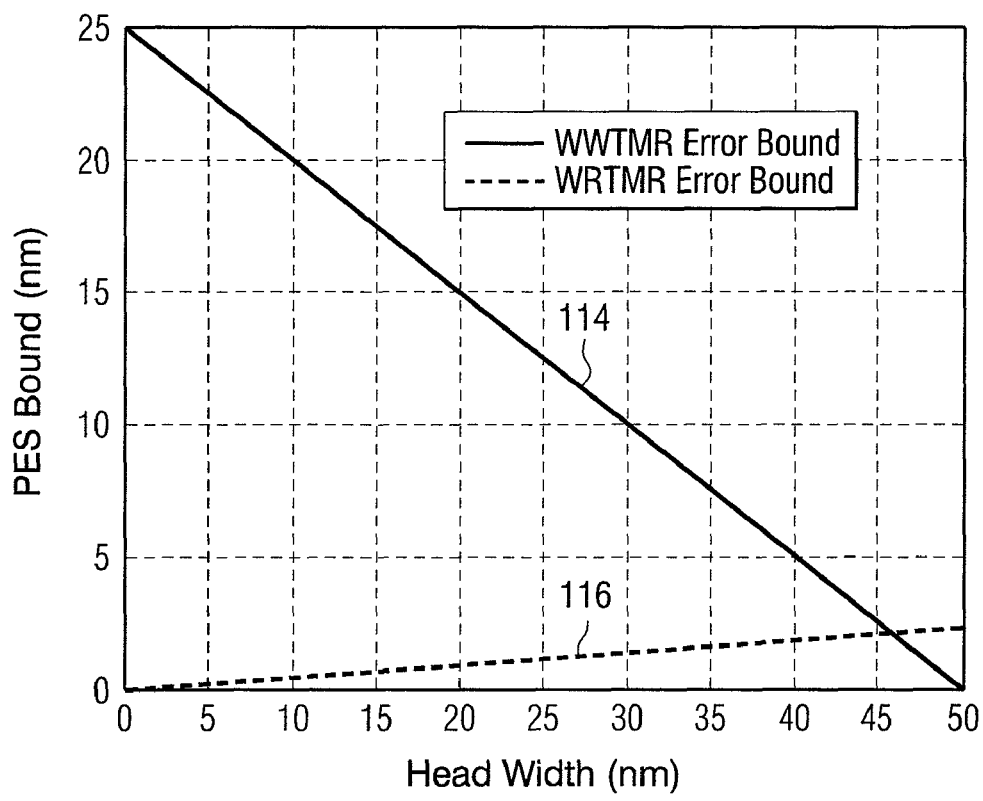
FIG. 8 is a graph showing the WWTMR and WRTMR position error bounds for 50 nm track pitch and 20 dB signal-to-noise ratio (SNR).

FIG. 8 shows the bounds given by WWTMR and WRTMR for a 50 nm track pitch and a 20 dB signal-to-noise ratio (SNR). The result given in equation (4) is at the intersection of curves 114 and 116, i.e., it is the bound for the optimal transducer width. The curve for WRTMR can move up or down depending on the desired minimum SNR.

Figure 9:
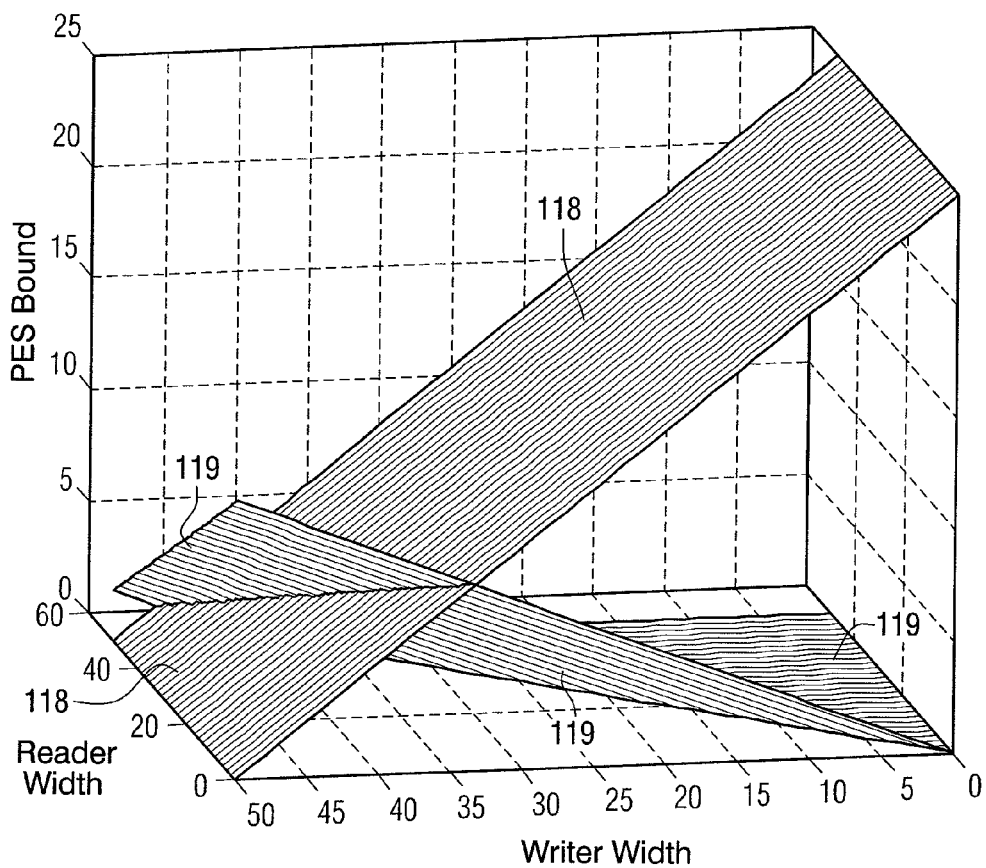
FIG. 9 is a graph showing a position error signal (PES) bound for a variable reader width.

In various transducer configurations, multiple electrodes can be used, i.e., a reader electrode and a writer electrode. FIG. 9 shows the PES bound for a variable reader width. If the reader width is allowed to be less than the writer width, the PES bound may be relaxed. The PES bound for this case is given by $$|PES| \leq \frac{W_w + (1-2\alpha)W_r}{4}, \quad (5)$$

where $W_w$ and $W_r$ are the writer and reader width, respectively. Note that equation (5) reduces to equation (2) when $W_r = W_w$. The sensitivity of the PES bound to the reader width is given by $$\frac{\partial |PES|_{max}}{\partial W_r} = \frac{1-2\alpha}{4}, \quad (6)$$

which means that for realistic values of α (i.e., approaching 1) the PES bound increases at approximately ¼ the rate that $W_r$ decreases. Of course, the reader width is also bounded by head/media SNR issues, so the PES bound cannot be increased arbitrarily. For the constraint that $W_r$ is greater than 30 nm, and with the conditions imposed on equation (4), the PES bound is increased to $$|PES| \leq 4.2 \text{ nm}. \quad (7)$$

Figure 10:
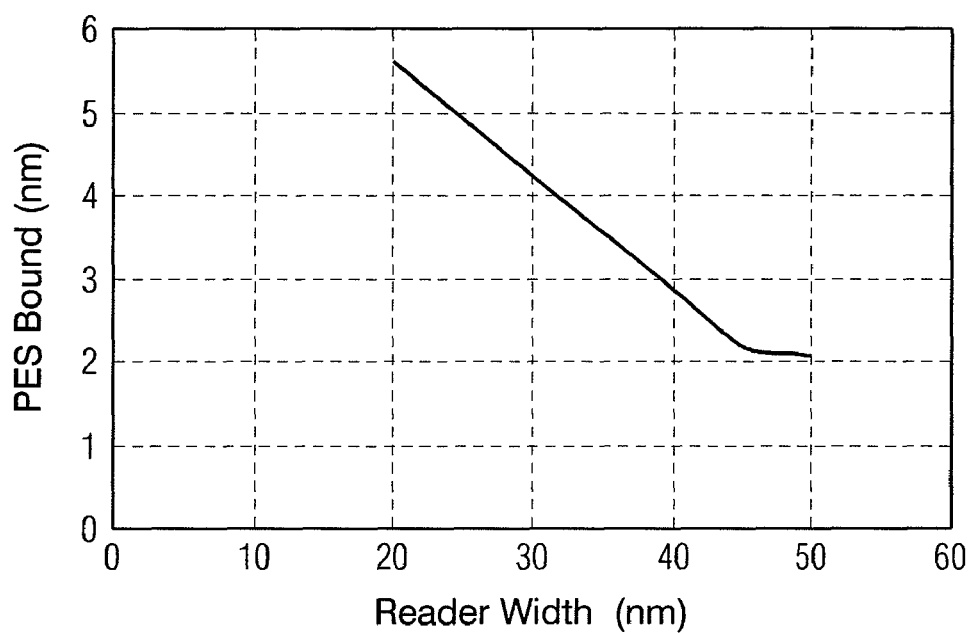
FIG. 10 is a graph showing the effect of the reader width lower bound on the PES bound.

This is a factor of 2 improvement over the case with equal reader/writer widths. FIG. 10 shows the relationship between the lower bound on $W_r$ and the PES limit.

Previous head designs use the same conductor for both reading and writing. In one aspect, the invention uses separate read and write electrodes, where the read electrode is narrower than the write electrode. A narrow read electrode configuration would allow less restrictive positioning accuracy requirements.

In one example, the invention provides a head having multiple conductors. FIGS. 11, 12 and 13 are side, top and end views of a cantilever head 120. The head is mounted on a substrate 122 by a base 124. Two electrodes 126 and 128 may be supported by a bi-layer structure 130 having layers 132 and 134 of different mechanical properties such that the head curves to a storage medium 136. Electrode 126 forms a read element and electrode 128 forms a write element. The read element has a width $W_1$ that is less than the width $W_2$ of the write element. An insulating layer 138 is provided between the read element and layer 132 to center the read element end on a center line 140 of the write element end. Arrow 142 shows the direction of movement of the storage medium. Center line 140 lies parallel to the down track direction of data written on the storage medium. The widths of the electrodes are measured in the cross track direction. The extent to which the head may be narrower than the writer depends on the minimum head width needed to achieve an acceptable SNR.

As shown in FIG. 13, the read head may be fabricated on an insulating layer that centers it with respect to the write element. This centering eliminates the need for moving the transducer between reading and writing, but adds a processing step. To avoid capacitive coupling, the write element may have the same voltage applied as the read element during reading, with the result being a narrow read/wide erase. The wide erase may also be useful to the servo subsystem of the controller.

In this example, one additional step can be used to lift off a thickness of approximately ½ the difference between the thicknesses of the reader and writer. The deposition could be performed using a liftoff step to deposit the insulator beneath the reader electrode. To get the desired thickness, atomic layer deposition (ALD) can be used. If the cross-talk is sufficiently low, the write element may be used to immediately rewrite data after a read.

In another example the read element can be fabricated directly onto the lever, without the insulating layer. This is easier to manufacture, but requires a "micro-jog" between reading embedded servo information and writing, i.e., the head must be moved slightly between reading and writing to have the read and write elements centered on the same track.

FIGS. 14, 15 and 16 are side, top and end views of another cantilever head 150 constructed in accordance with another aspect of the invention. The head is mounted on a substrate 152 by a base 154. Three electrodes 156, 158 and 160 are supported by a bi-layer structure 162 having layers 164 and 166 of different mechanical properties such that the head curves to a storage medium 168. Electrode 158 forms a read element and electrodes 156 and 160 form write elements. The read element has a width $W_1$ that is less than the width $W_2$ of the write elements. An insulating layer 170 is provided between the read element and layer 164 to center the read element end on a center line 172 of the write element end. Arrow 174 shows the direction of movement of the storage medium. Center line 172 lies parallel to the down track direction of data written on the storage medium. The widths of the electrodes are measured in the cross track direction.

The conductors of FIGS. 11-16 can be fabricated using the same techniques as those used to create the probe head of FIGS. 3, 4 and 5. Two or three conductors may be used depending on the need for bi-directional read support.

The example of FIGS. 14, 15 and 16 is similar to the example of FIGS. 11, 12 and 13, except that a third conductor is added. The third conductor allows wide erase in both directions, but there will be capacitive coupling with at least one write element. Also, the third conductor requires a longer head, which compounds skew concerns. If cross-talk is sufficiently small, a write-read-write technique could be used to verify data while writing.

When using multiple conductors for each reader and writer, the readers and writers should be lined up with each other. In one example, the PES may be controlled to within about <2 nm. Since an array of readers and writers would be used, the alignment between the readers and writers must be at near atomic resolution. To accomplish this, a planar, non-lever structure, as shown in FIGS. 17 and 18, can be used to define the alignment of the reader and writer electrodes on the natural etching planes of silicon.

Figure 17:
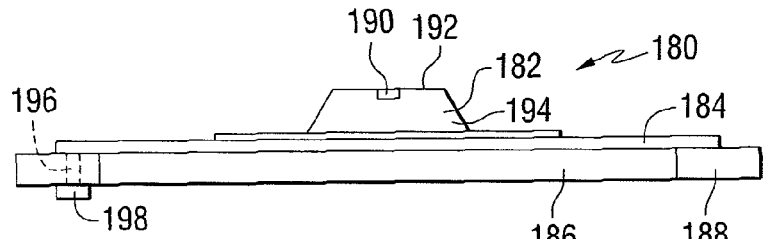
FIG. 17 is a cross-sectional view of a transducer assembly.
Figure 18:
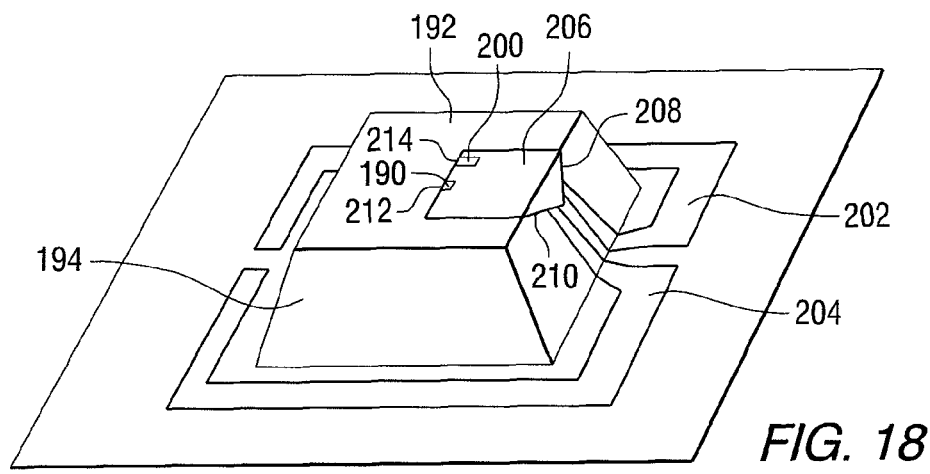
FIG. 18 shows an isometric view of the transducer of the assembly of FIG. 17.

FIG. 17 is a cross-sectional view of the assembly of FIG. 18, and shows another example, which includes a head assembly 180 having a head 182 mounted on a spring suspension 184. The spring suspension is positioned over an opening 186 in a substrate 188. A read electrode 190 can be positioned adjacent to a surface 192 of the head. The read electrode 190 is electrically connected to a terminal such as item 18 in FIG. 1, using conductors not shown in this view. For example, the read electrode can be connected to a conductor that extends through or on the head body 194 to the suspension, which can be made of conductive material. A via 196 can be provided in the substrate to connect the suspension to a conductor 198 on the bottom of the substrate. Conductor 198 could then be connected to a terminal. Various types of suspensions can be used to support the head and to hold the head in contact with an adjacent storage medium, or to move the head into contact with the storage medium. This invention is not limited to any particular type of suspension.

FIG. 18 shows an isometric view of the head 182, which includes a write electrode 200 and a read electrode 190. The width of the end of the write electrode is greater than the width of the end of the read electrode. The write electrode is electrically connected to a conductor 202. The read electrode is electrically connected to a conductor 204. An insulator 206 provides electrical isolation between the read and write electrodes. The sides 208 and 210 of the insulator can be positioned in crystallographic planes of the material used to form the head body.

Silicon has the property of having a natural etch stop on (111) crystallographic planes. This can be used to etch a (100) surface, where the (111) surfaces will form an atomically smooth surface at a 54.7° angle to (100) plane. The same technique can be used on other crystal orientations to give similar results. For example, etching of a (110) surface will form a (111) etch surface at 90° to the (110) plane.

The width differences between the reader and the writer can be controlled very precisely and the readers and writers can be lined up with atomic resolution. This alignment is important in that any variation among an array of readers/writers will cause misalignment between the readers and writers.

The reader and writer wall profiles 212 and 214, defined in this case by the crystallographic etch planes (e.g. (111)) of silicon, are parallel to each other. At the end of processing, the upper surface of the head can be trimmed to make the electrode edges adjacent to a crystallographic etch plane. The conductors are placed far enough from each other to eliminate cross-talk concerns, but close enough together that they do not create a head skew issue.

In another aspect, the invention uses separate read and write voltages to achieve a narrow read/wide write scheme. Heads that are used to implement this aspect of the invention can use a single conductor for both reading and writing, but use different voltages for reading and writing so that the effective field width is narrower for reading than for writing.

Figure 19:
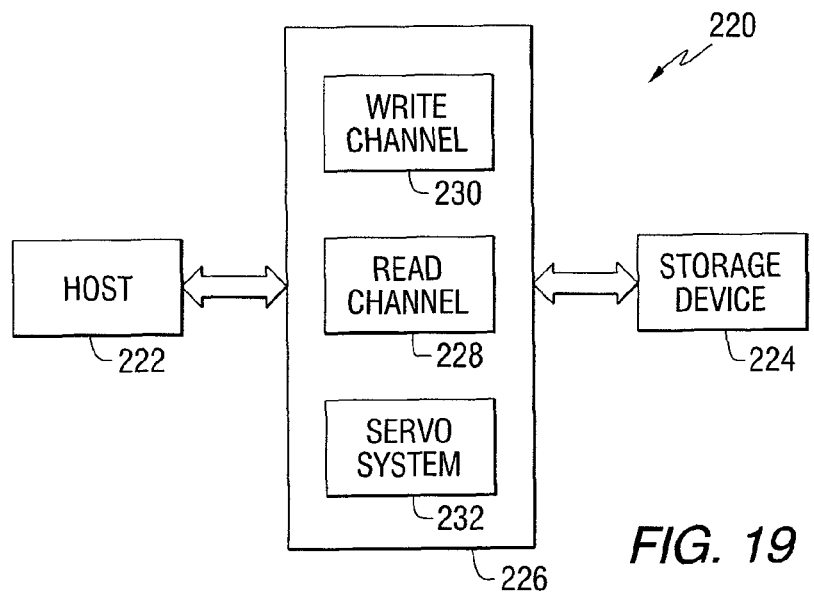
FIG. 19 is a block diagram of a system that can be used to implement one aspect of the invention.

FIG. 19 is a block diagram of a system 220 that can be used to implement one aspect of the invention. The system includes a host device 222, which can be for example a computer or other device that operates in combination with a data storage device 224. A controller 226 can be used to control the operation of the data storage device. The controller can include, for example, a read channel 228, a write channel 230, and a servo system 232 that controls the position of heads in the data storage device.

To write a bit to the storage medium, a voltage pulse of either positive or negative polarity can be applied between the electrode and the medium, and a binary "1" or "0" is stored by causing the polarization of a spatially small region (i.e., a domain) of the ferroelectric storage medium near the tip to point "up" or "down". Readout can be performed by applying a read voltage of a magnitude and polarity such as to cause the polarization to point "up". Domains polarized "down" (e.g., representing "0"), will then switch to the "up" state, and a charge will flow which is proportional to the remanent polarization of the ferroelectric storage medium. Domains polarized "up" will have no such current flow. The presence or absence of this current flow, as determined by a sense amplifier, can then be used to determine whether the domain had contained a "1" or "0".

When used in combination with a probe type data storage device having a ferroelectric storage medium, and heads that include at least one electrode, the write voltage can have a larger magnitude than the read voltage. By using a higher write voltage, the bits written to the storage medium will have a larger size, and the range of acceptable positions of the head during reading will be larger.

To demonstrate the voltage-dependency of the written tracks, a coarse bit pattern was written to a ferroelectric storage medium, and the size of the recording bits was examined. The results of this demonstration show that the data track width increases with increasing voltage.

While the invention has been described in terms of several examples, it will be apparent to those skilled in the art that various changes can be made to the described examples without departing from the scope of the invention as set forth in the following claims.

What is claimed is:

1. An apparatus comprising:
   a storage medium; and
   a transducer positioned adjacent to the storage medium, wherein the transducer includes a first electrode and a second electrode, with the width of the first electrode being less than the width of the second electrode, wherein the first electrode is a read electrode and the second electrode is a write electrode.

2. The apparatus of claim 1, further comprising:
   a suspension assembly supporting the transducer.

3. The apparatus of claim 1, wherein ends of the first and second electrodes are centered on a common axis.

4. The apparatus of claim 3, further comprising:
   an insulating layer between the first electrode and a support structure.

5. The apparatus of claim 1, further comprising:
   a third electrode, wherein the second and third electrodes are positioned on opposite sides of the first electrode.

6. The apparatus of claim 5, wherein the width of the first electrode is less than the width of the third electrode.

7. The apparatus of claim 5, wherein the third electrode is a write electrode.

8. The apparatus of claim 1, wherein the first and second electrodes are mounted on a cantilever support.

9. The apparatus of claim 1, further comprising:
   a shield positioned between the first and second electrodes.

10. An apparatus comprising:
    a storage medium; and
    a transducer positioned adjacent to the storage medium, wherein the transducer includes a first electrode and a second electrode, with the width of the first electrode being less than the width of the second electrode, wherein the first and second electrodes are mounted on a silicon body and edges of the first and second electrodes lie adjacent to crystallographic planes of the silicon body.

11. The apparatus of claim 10, wherein conductors connected to the first and second electrodes lie adjacent to crystallographic planes of the silicon body.

12. The apparatus of claim 10, wherein the transducer is mounted on a spring suspension.

13. The apparatus of claim 12, wherein the spring suspension is positioned over an opening in a substrate.

14. The apparatus of claim 13, further comprising:
    a via in the substrate connecting the spring suspension to a conductor on the substrate.

15. The apparatus of claim 10, further comprising:
    an insulator between the first and second electrodes.

16. A method comprising:
    positioning a transducer adjacent to a storage medium, wherein the transducer includes a first electrode and a second electrode, with the width of the first electrode being less than the width of the second electrode; and
    applying the same voltage to the first and second electrodes when reading data from the storage medium.

17. The method of claim 16, wherein the storage medium is a ferroelectric storage medium.

18. The method of claim 16, wherein the first and second electrodes are positioned on a common axis.

19. The method of claim 16, wherein the transducer includes a third electrode.

* * * * *